US007680989B2

(12) United States Patent
Moir et al.

(10) Patent No.: US 7,680,989 B2
(45) Date of Patent: *Mar. 16, 2010

(54) INSTRUCTION SET ARCHITECTURE EMPLOYING CONDITIONAL MULTISTORE SYNCHRONIZATION

(75) Inventors: Mark S. Moir, Hampton, NH (US); Robert E. Cypher, Saratoga, CA (US); Paul N. Loewenstein, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 11/465,383

(22) Filed: Aug. 17, 2006

(65) Prior Publication Data
US 2007/0043933 A1 Feb. 22, 2007

Related U.S. Application Data

(60) Provisional application No. 60/708,928, filed on Aug. 17, 2005.

(51) Int. Cl.
*G06F 13/00* (2006.01)
(52) U.S. Cl. ...................................... 711/152; 712/226
(58) Field of Classification Search ................. 712/220, 712/226; 711/152
See application file for complete search history.

(56) References Cited

U.S. PATENT DOCUMENTS

| | | | | |
|---|---|---|---|---|
| 5,193,167 A | * | 3/1993 | Sites et al. ................... 711/163 |
| 5,499,356 A | * | 3/1996 | Eckert et al. ................. 711/152 |
| 5,742,785 A | * | 4/1998 | Stone et al. .................. 712/217 |
| 6,098,156 A | * | 8/2000 | Lenk ........................... 711/146 |
| 6,128,710 A | * | 10/2000 | Greenspan et al. ........... 711/152 |
| 6,141,734 A | * | 10/2000 | Razdan et al. ............... 711/144 |
| 7,089,364 B2 | | 8/2006 | Arimilli et al. |
| 7,200,717 B2 | | 4/2007 | Guthrie et al. |
| 7,293,143 B1 | * | 11/2007 | Shavit et al. ................. 711/147 |
| 7,343,456 B2 | | 3/2008 | Rowlands |
| 2003/0037223 A1 | * | 2/2003 | Steely et al. ................... 712/28 |
| 2003/0041225 A1 | | 2/2003 | Kim et al. |
| 2003/0217115 A1 | * | 11/2003 | Rowlands ..................... 709/214 |

(Continued)

OTHER PUBLICATIONS

Alpha Architecture Reference Manual (Alpha) (Alpha Architecture Reference Manual); Jan. 2002.*

(Continued)

*Primary Examiner*—Eddie P Chan
*Assistant Examiner*—Keith Vicary
(74) *Attorney, Agent, or Firm*—Robert C. Kowert; Meyertons, Hood, Kivlin, Kowert & Goetzel, P.C.

(57) ABSTRACT

We propose a class of mechanisms to support a new style of synchronization that offers simple and efficient solutions to several existing problems for which existing solutions are complicated, expensive, and/or otherwise inadequate. In general, the proposed mechanisms allow a program to read from a first memory location (called the "flagged" location), and to then continue execution, storing values to zero or more other memory locations such that these stores take effect (i.e., become visible in the memory system) only while the flagged memory location does not change. In some embodiments, the mechanisms further allow the program to determine when the first memory location has changed. We call the proposed mechanisms conditional multi-store synchronization mechanisms and define aspects of an instruction set architecture consistent therewith.

20 Claims, 4 Drawing Sheets

U.S. PATENT DOCUMENTS

| | | |
|---|---|---|
| 2004/0015642 A1 | 1/2004 | Moir |
| 2005/0289300 A1 | 12/2005 | Kim et al. |
| 2006/0085603 A1 | 4/2006 | Guthrie et al. |
| 2006/0161919 A1* | 7/2006 | Onufryk et al. ............. 718/102 |
| 2007/0033345 A1 | 2/2007 | Guthrie et al. |
| 2007/0043933 A1 | 2/2007 | Moir et al. |
| 2009/0063881 A1* | 3/2009 | Stephens ..................... 713/320 |
| 2009/0198933 A1* | 8/2009 | Arimilli et al. .............. 711/163 |

OTHER PUBLICATIONS

NN80024297 "Conditional Multiple Store Instruction" IBM Technical Disclosure Bulletin, Feb. 1980, US; Volume No. 22 ; Issue No. 9 ; Page No. 4297-4299.*

NN9312441 "Handling Reservations in Multiple-Level Cache" IBM Technical Disclosure Bulletin, Dec. 1993, US; Volume No. 36; Issue No. 12 ; Page No. 441-446.*

U.S. Appl. No. 10/670,495, filed Sep. 24, 2003 and naming as inventor(s) Shavit et al.

U.S. Appl. No. 10/894,828, filed Jul. 20, 2004 and naming as inventor(s) Moir et al.

U.S. Appl. No. 10/894,829, filed Jul. 20, 2004 and naming as inventor(s) Moir et al.

U.S. Appl. No. 10/915,502, filed Aug. 10, 2004 and naming as inventor(s) Moir.

U.S. Appl. No. 11/026,849, filed Dec. 30, 2004 and naming as inventor(s) Moir et al.

U.S. Appl. No. 10/995,885, filed Nov. 23, 2004 and naming as inventor(s) Shavit et al.

U.S. Appl. No. 11/008,692, filed Dec. 9, 2004 and naming as inventor(s) Lev et al.

U.S. Appl. No. 11/465,376, filed Aug. 17, 2006 and naming as inventor(s) Moir et al.

U.S. Appl. No. 10/866,570, filed Jun. 11, 2004 and naming as inventor(s) Moir et al.

U.S. Appl. No. 10/895,519, filed Jul. 20, 2004 and naming as inventor(s) Moir et al.

Afek, Y., "Atomic Snapshots of Shared Memory," Journal of the ACM, vol. 40, No. 4, pp. 873-890, 1993.

Agesen, O. at el., "An Efficient Meta-Lock for Implementing Ubiquitous Synchronization," ACM SIGPLAN Notices, vol. 34, No. 10, pp. 207-222, Oct. 1999.

Anderson, J. H. et al., "Universal Constructions for Large Objects," IEEE Transactions on Parallel and Distributed Systems, vol. 10, No. 12, pp. 1317-1332, 1999.

Attiya, H. et al., "An Adaptive Collect Algorithm with Applications," Distributed Computing, vol. 15, No. 2, pp. 87-96, 2002.

Barnes, G., "A Method for Implementing Lock-Free Shared Data Structures," Proceedings of the 5th ACM Symposium on Parallel Algorithms and Architectures, pp. 261-270, ACM Press, New York, NY 1993.

Doherty, et al., "Bringing Practical Lock-Free Synchronization to 64-Bit Applications," POCD '04, Jul. 25-28, 2004, St. John's. Newfoundland, Canada, 9 pages.

Goodman, J. R., et al., "Efficient Synchronization Primitives for Large-Scale Cache-Coherent Multiprocessors," Proceedings of the Third International Conference on Architectural Support for Programming Languages and Operating Systems, pp. 64-75, ACM Press, New York, NY 1989.

Harris, T., et al., "A Practical Multi-Word Compare-and-Swap Operation," in Proceedings of 16th International Symposium on Distributed Computing, 2002, 15 pages.

Harris, T., et al., "Language Support for Lightweight Transactions," Proc. 18th Annual ACM SIGPLAN Conf. on Object-Oriented Programming Systems, Languages, and Applications, pp. 388-402, ACM Press, New York, NY, 2003.

Herlihy, M., et al., "Transactional Memory: Architectural Support for Lock-Free Data Structures," Proc. 20th International Symposium in Computer Architecture, pp. 289-300, IEEE Computer Society, Washington, D.C., 1993.

Herlihy, M., "Dynamic-Sized Lockfree Data Structures," Sun Microsystems Technical Report SMLI TR-2002-110, Jun. 2002.

Herlihy, M. et al., "The Repeat Offender Problem: A Mechanism for Supporting Dynamic-Sized Lock-Free Data Structures," Sun Microsystems Technical Report SMLI TR-2002-112, Jul. 2002.

Herlihy, M. et al., "Obstruction-Free Synchronization: Double-Ended Queues as an Example," Proceedings of the 23rd International Conference on Distributed Computing, IEEE Computer Society, Washington, D.C., 2003.

Jensen, E.H. et al., "A New Approach to Exclusive Data Access in Shared Memory Multiprocessors," Lawrence Livermore National Laboratory, UCRL-97663, Nov. 1987.

Lamport, L., "A Fast Mutual Exclusion Algorithm," ACM Transactions on Computer Systems, vol. 5, No. 1, pp. 1-11, 1987.

Lev, Y. et al., "Fast read sharing mechanism for software transactional memory," 23rd Annual ACM SIGACT-SIGOPS Symposium on Principles of Distributed Computing (PODC 2004) poster presentation, Jul. 2004, 6 pages.

Luchangco, V. et al., "Nonblocking k-compare-single-swap," Proceedings of the 15th Annual ACM Symposium on Parallel Algorithms and Architectures, pp. 314-323, ACM Press, New York, NY, 2003.

Michael, M. M. et al., "Non-Blocking Algorithms and Preemption Safe Locking on Multiprogrammed Shared Memory Multiprocessors," Journal of Parallel and Distributed Computing, vol. 51, No. 1, pp. 1-26, May 25, 1998.

Michael, M. M. et al., "Safe Memory Reclamation for Dynamic Lock-Free Objects Using Atomic Reads and Writes," Proceedings of the 21st Annual ACM Symposium on the Principles of Distributed Computing, pp. 21-30, ACM Press, New York, NY, 2002.

Michael, M., "Scalable Lock-Free Dynamic Memory Allocation," Proceedings of the ACM SIGPLAN 2004 Conference on Programming Language Design and Implementation, pp. 35-46, ACM Press, New York, NY, 2004.

Moir, M. et al., "Wait-Free Algorithms for Fast, Long-Lived Renaming," Science of Computer Programming, vol. 25, No. 1, pp. 1-39, Aug. 1995.

Moir, M., "Practical implementation of non-blocking synchronization primitives," Proceedings of the Sixteenth Annual ACM Symposium on Principles of Distributed Computing, pp. 219-228, ACM Press, New York, NY, 1997.

Moir, M., "Transparent Support for Wait-Free Transactions," Proceedings of the 11th International Workshop on Distributed Algorithms, pp. 305-319, Springer-Verlag, London, UK, 1997.

Moir, M., "Laziness Pays! Using Lazy Synchronization Mechanisms to Improve Non-Blocking Constructions," Proc. 19th Annual ACM Symposium on Principles of Distributed Computing, pp. 61-70, ACM Press, New York, NY, 2000.

Moir, M. et al., "A Scalable and Lock-Free FIFO Queue Algorithm," Aug. 9, 2004, 10 pages.

Shavit, N. et al., "Software Transactional Memory," Distributed Computing, vol. 10, No. 2, pp. 99-116, Feb. 1997.

Rajwar, R. et al., "Speculative Lock Elision: Enabling Highly Concurrent Multithreaded Execution," International Symposium on Microarchitecture, pp. 294-305, IEEE 2001.

Rajwar, R. et al. "Transactional Lock-Free Execution of Lock-Based Programs," Appears in the proceedings of the Tenth International Conference on Architectural Support for Programming Languages and Operating Systems (ASPLOS), ACM 2002.

Office Action from U.S. Appl. No. 11/465,376 mailed Jun. 9, 2008.

* cited by examiner

INSTRUCTION SET ARCHITECTURE EMPLOYING CONDITIONAL MULTISTORE SYNCHRONIZATION

CROSS-REFERENCE TO RELATED APPLICATION(S)

The present application claims priority under 35 U.S.C. § 119(e) of Provisional Application No. 60/708,928, filed Aug. 17, 2005. In addition, the present application is related to U.S. application Ser. No. 11/465,376, entitled "CONDITIONAL MULTI-STORE SYNCHRONIZATION MECHANISMS", naming Moir, Cypher and Loewenstein as inventors and filed on even date herewith, the entirety of which is incorporated herein by reference.

BACKGROUND

1. Field of the Invention

The present invention relates to concurrency mechanisms and, in particular, to instruction set processors, methods and program products that implement or exploit conditional multi-store synchronization.

2. Description of the Related Art

Synchronization techniques based on use of load-linked/store-conditional (LL/SC) instruction pairs have been supported in a variety of processor designs, including at least some processors based on MIPS, Alpha, and PowerPC instruction set architectures. Unfortunately, current implementations of LL/SC synchronization techniques present limitations that affect their usefulness for coordination of competing computations. For example, only a single store can be made conditional upon a previous load. Also, implementations typically require that a store-conditional instruction target the same memory location as the preceding load-linked.

Transactional memory provides another framework for coordination amongst competing computations. Indeed, a variety of designs for transactional memory and similar mechanisms appear in the literature. Unfortunately, the strong semantics of transactional memory mechanisms (at least as typically proposed) tends to result in complex implementation requirements and, as a practical matter, imposes limits on scaling of transaction read and/or write sets. In general, a transactional memory monitors locations read previously and prevents subsequent stores from taking effect if a monitored location changes. However, transactional memory and related mechanisms must buffer all stores, ensuring that none of them takes effect, until the entire sequence (or transaction) is completed. This naturally imposes limits on the number of stores that can be executed by any transaction. Furthermore, transactional memory may have to monitor multiple locations that are read by the transaction. This again imposes limitations. For example, in a design based on monitoring cache lines in a 4-way set associative cache, a particular transaction might happen to access 5 variables that all map to the same cache set, and such a transaction is doomed to fail deterministically.

In general, it would be desirable if programmers did not have to reason about such things. Alternative techniques are desired.

SUMMARY

We propose a class of mechanisms to support a new style of synchronization that offers simple and efficient solutions to several existing problems for which existing solutions are complicated, expensive, and/or otherwise inadequate. In general, the proposed mechanisms allow a program to read from a first memory location (called the "flagged" location), and to then continue execution, storing values to zero or more other memory locations such that these stores take effect (i.e., become visible in the memory system) only while the flagged memory location does not change. In some embodiments, the mechanisms further allow the program to determine when the first memory location has changed. We call the proposed mechanisms "conditional multi-store synchronization mechanisms."

Because the semantics of conditional multi-store is weaker than that of transactional memory and related mechanisms, implementations of our mechanisms do not exhibit the same limitations as typical transactional memory designs. For example, because successively executed stores in a conditional multi-store sequence do not have to take effect atomically, there is no need to buffer them all before allowing any to take effect. Accordingly, the size of a store buffer provided by underlying hardware does not impose a limitation on how many stores can be performed. As a result, some implementations of conditional multi-store mechanisms in accordance with the present invention facilitate concurrency techniques and algorithms in which an arbitrary number of conditional stores may be performed.

In some embodiments in accordance with the present invention, a method of operating a processor includes operational responses to load-and-flag and conditional-store instructions. In response to a load-and-flag instruction that specifies a load source as an operand, processor acquires ownership of a set of addressable storage locations, the acquired set covering the load source. In response to a first conditional-store instruction that specifies a first store target as an operand, the processor stores a first result to the first store target if the previously acquired set remains owned and contents thereof remain unmodified. In response to a successive second conditional-store instruction that specifies a second store target as an operand, the processor stores a second result to the second store target if the previously acquired set remains owned and contents thereof remain unmodified.

In some embodiments in accordance with the present invention, a computer program product is encoded in one or more machine readable media. The computer program product includes an instruction sequence executable on a processor. The instruction sequence includes a load-and-flag instruction followed in program order by at least two successive conditional-store instructions, wherein the conditional-store instructions successfully complete if, at the respective times of execution, a load source of the preceding load-and-flag operation remains owned by the processor and contents thereof remain unmodified.

In some embodiments in accordance with the present invention, a processor implements an instruction set that includes both a load-and-flag instruction and a conditional-store instruction. The load-and-flag instruction specifies a load source as an operand and, upon execution of the load-and-flag instruction, the processor attempts to acquire ownership of a set of addressable storage locations, the acquired set covering the load source. The conditional-store instruction specifies a store target as an operand and, upon execution of successive instances of the conditional-store instruction, the processor stores a respective result to a respective store target only if, at the respective time of execution, the previously acquired set remains owned and contents thereof remain unmodified.

These and other variations will be understood with reference to the appended claims.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
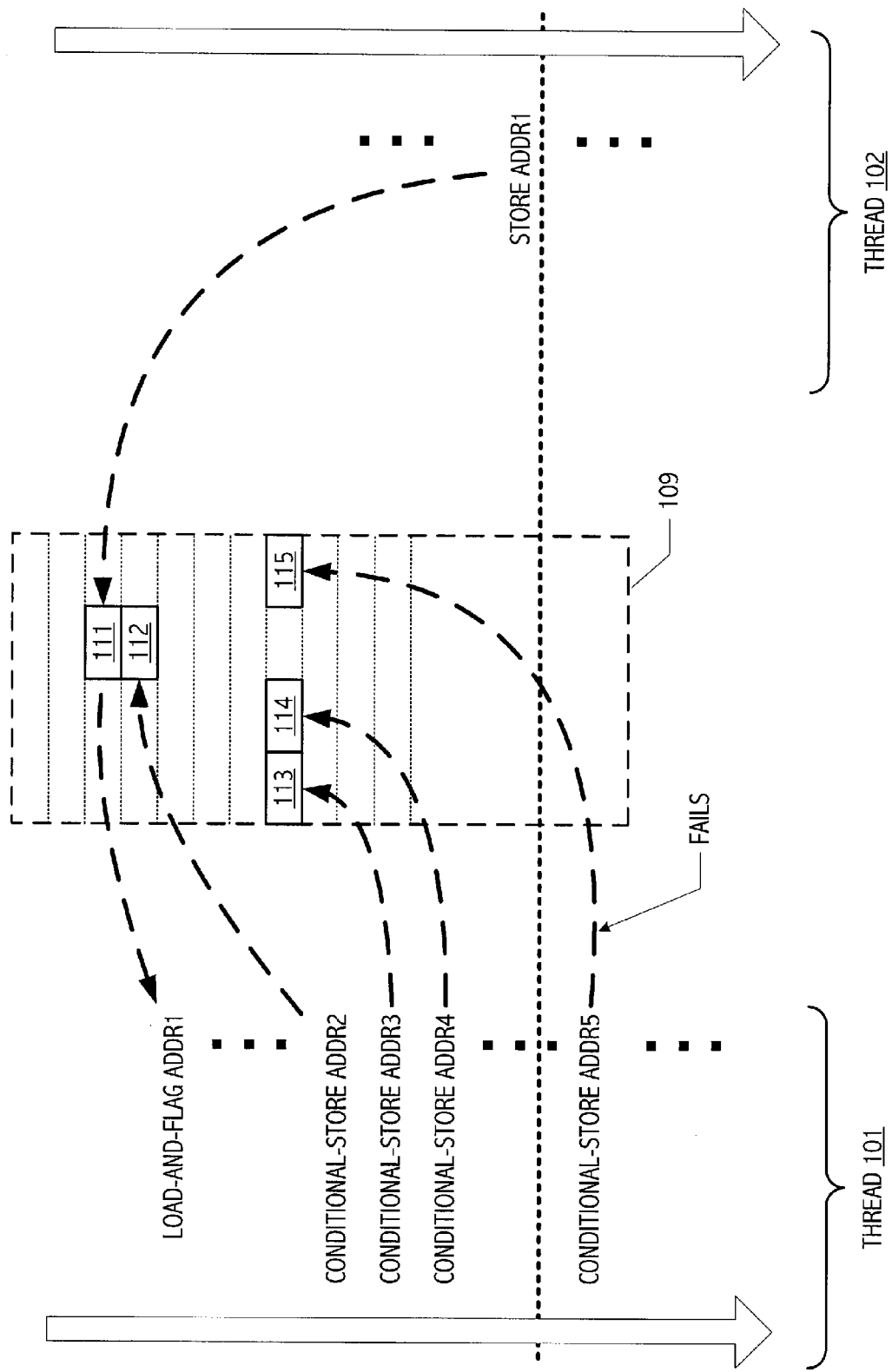
FIG. 1 depicts threads of execution operating on memory using load-and-flag and conditional-store instructions in accordance with some embodiments of the present invention.

Versatile mechanisms have been developed for coordination amongst threads of one or more multithreaded computations. In particular, we describe herein a class of developed mechanisms that support a new style of synchronization offering both simple and efficient solutions to several problems for which existing solutions can be complicated, expensive, and/or otherwise inadequate. We call the proposed mechanisms "conditional multi-store synchronization mechanisms." In general, such mechanisms may be concretely realized in a variety of forms, including:

- as processor and/or memory system implementations that manage access to addressable storage in the ways we describe herein (with or without the particular operation semantics described herein); and/or
- as instruction set architectures or instruction sequences that provide or include operations with load-and-flag, conditional-store operation semantics (whether or not supported using particular processor and/or memory system facilities described herein).

The proposed mechanisms allow a program to read from a first memory location (sometimes called a "flagged" location), and to then continue execution, storing values to zero or more other memory locations such that these stores take effect (i.e., become visible to the memory system) only if contents of the flagged memory location have not changed or been updated. In some embodiments, the mechanisms further allow the program to determine if contents of the flagged memory location have been changed or updated.

In some realizations, cache designs and/or load-store execution units or pipes are augmented to provide the desired functionality. In some realizations, instruction sets are extended to allow programmers (or compilers) direct access to conditional multi-store mechanisms. We use such exemplary realizations as a descriptive context in which to illustrate our techniques. Nonetheless, other realizations are also envisioned, including those in which operations having semantics consistent with the conditional multi-store mechanisms described herein need not be directly visible to application programmers (or compilers) and those in which other underlying mechanisms, logic or functional blocks support semantics of conditional multi-store synchronizations. Such realizations will be appreciated by persons of ordinary skill in the art based on the description herein.

For purposes of illustration, we contrast our techniques with certain aspects, features or limitations of typical transactional memory designs. However, it is important to recognize that our conditional multi-store techniques are not themselves inconsistent with transactional memory models. Rather, in some realizations, our techniques may complement and, indeed, facilitate implementations of transactional memory. Accordingly, nothing herein is to be taken as disavowal of any transactional memory implementation that employs, coexists with or builds upon the techniques we describe. In particular, the conditional multi-store mechanisms described herein facilitate implementations of transactional memory models (particularly, software or hybrid hardware/software transactional memory) in which it is possible to commit transactions of arbitrary size.

For conciseness of description, we do not now detail a range of suitable transactional memory designs. Instead, illustrative transactional memory designs are described in significant detail in commonly-owned, co-pending U.S. patent application Ser. No. 10/915,502, filed Aug. 10, 2004, entitled "HYBRID SOFTWARE/HARDWARE TRANSACTIONAL MEMORY" and naming Mark S. Moir as inventor and in commonly-owned, co-pending U.S. patent application Ser. No. 10/621,072, filed Jul. 16, 2003, entitled "SOFTWARE TRANSACTIONAL MEMORY FOR DYNAMICALLY SIZABLE SHARED DATA STRUCTURES" and naming Mark S. Moir, Victor Luchangco and Maurice Herlihy as inventors application Ser. Nos. 10/915,502 and 10/621,072 are incorporated herein by reference. Additional software, hardware and hybrid designs are known in the art. Accordingly, based on the description herein (including that incorporated by reference), persons of ordinary skill will appreciate transactional memory implementations that employ, coexist with or build upon the conditional multi-store techniques we describe.

Therefore, in view of the above, and without limitation, certain illustrative exploitations of the inventive techniques are described with particular attention to conventional transactional memory interfaces and facilities. While we briefly contrast limitations of certain conventional transactional memory implementations, such contrast serves only to illustrate the utility of our techniques for use in novel transactional memory designs or as a competing or complementary mechanism. The invention(s) is (are) defined solely by the claims that follow.

Motivations, Generally

The use of conditional multi-store techniques described herein can substantially simplify solutions to problems that commonly arise in the design of non-blocking software. Such problems include preventing a store executed by a "slow" thread from overwriting newer data written by another thread. This problem arises frequently when designing non-blocking algorithms or mechanisms because the use of locks is inconsistent with non-blocking goals.

As an example, consider a thread that is about to execute a store instruction, but is preempted before it does so. When it is eventually rescheduled, it will execute the store, even though it decided to do so based on information it read a relatively long time ago. In the meantime, other threads may have written new data to the location, and the information that the first thread used to decide to store the new value may be out of date.

Most non-blocking algorithms in the literature that are applicable to multiprocessor machines based on processors commercially available from Sun Microsystems, Inc., Intel, and AMD deal with this problem by storing additional control data, e.g., version numbers or "tags," together with the data being written, and by replacing the store instruction with an atomic instruction such as a compare-and-swap. Then, the algorithm is modified to ensure that the version number or tag changes each time the data is updated, thereby causing such "late" attempts to modify the data to fail. This approach has serious drawbacks. First, the tags or version numbers usually require a number of bits to be used in addition to the bits used for real data. This can lead to significant space overhead, and also restricts the range of values that can be stored atomically, because the stored value and the tag or version number must be stored together in a single location that can be atomically accessed by a compare-and-swap instruction (usually 32 or 64 bits). This affects data layout, and often causes the algorithm designer to "play compiler" because standard compilers do not accommodate this arrangement.

Furthermore, the algorithm designer must avoid the so-called ABA problem, in which a tag is repeated, or a version number "wraps around" causing a compare-and-swap that should fail to succeed. Typically, solutions require that an implementation dedicate a sufficient number of bits to version numbers that the wraparound does not happen in practice. If tags are used instead of version numbers avoiding the ABA problem usually requires advance knowledge of the maximum number of threads that will use the algorithm, which is of course very undesirable. On top of the disadvantages of these solutions, they are notoriously difficult to get right, and account for a surprising number of bugs in proposed non-blocking algorithms. Finally, replacing store instructions with compare-and-swap instructions results in very substantial overhead, often rendering performance unacceptable.

Taken together, these practical drawbacks tend to explain why relatively few non-blocking algorithms have been deployed in practice to date, despite their very appealing properties. The conditional multi-store techniques that we describe herein can provide programmers with a mechanism to code store-type operations that succeed only if a memory location read previously has not changed since it was read. This capability can facilitate simple and efficient solutions to a number of problems that have previously required difficult or expensive solutions, or solutions that impose unreasonable constraints on the program and the layout of data.

Transactional Memory Exploitations

An important set of exploitations for the techniques we describe involves transactional memory, particularly software transactional memory implementations and so-called "hybrid" transactional memory implementations which coordinate transactions that may be attempted (or committed) using hardware support and/or software mechanisms. Typically, in such implementations, changes made by a transaction are buffered in the transaction's write set until the transaction commits. Before the locations affected by the changes in the write set can be accessed by subsequent transactions, the changes in the write set are usually copied from the write set to the target memory locations. Because we prefer our transactional memory implementations to be non-blocking, it is important that if the thread executing a transaction is delayed (e.g., preempted) while copying changes back from its write set to the affected memory locations, then other threads can "help" to finish the copying. However, if multiple threads are attempting to do this copying, and one of them is delayed until after the copying is finished, that thread might incorrectly write an old value over data written by subsequent transactions.

At least in the case of hybrid transactional memory, it is generally not acceptable to use tags or version numbers on memory locations accessed by transactions, because the software transactional memory must interact correctly and transparently with hardware transactional memory. Accordingly, conventional techniques such as those which add version numbers or tags to each memory word are inapplicable.

Some solutions to this problem simply accept that an implementation will not be completely non-blocking, and attempt to minimize the negative impact of the blocking that is introduced. Other solutions can depend on special operating system or hardware support, which though feasible, may not be widely available. In contrast, our conditional multi-store techniques provide solutions that are more general and which can allow improved transactional memory designs. To illustrate, we refer generally to software mechanisms described in U.S. patent application Ser. No. 10/915,502, filed Aug. 10, 2004, entitled "HYBRID SOFTWARE/HARDWARE TRANSACTIONAL MEMORY" and naming Mark S. Moir as inventor, the entirety of which is incorporated herein by reference.

In at least some of the transactional memory implementations described, a transaction has a status word, which indicates a current phase of the transaction. When a transaction is in the "COMMITTED" phase, values from its write set need to be copied back to respective target locations. U.S. patent application Ser. No. 10/915,502 describes at least one implementation of a transaction commit sequence, tr_commit( ), which iterates over the transaction's write set, copying the values it accumulated during its execution into the appropriate memory locations. Conditional multi-store techniques described herein can be used in a simple and efficient mechanism that allows multiple threads to attempt to do this copying, while ensuring that slow threads doing so do not cause problems later by overwriting newer data.

In the material that follows, we illustrate an application of our conditional multi-store techniques using a stylized pseudo-code implementation of a copy_write_set( ) function that could be employed in the implementation of tr_commit( ) or similar facilities. For concreteness, we first introduce an illustrative instruction set interface to a conditional multi-store mechanism.

Conditional Multi-Store Synchronization, Generally

A variety of approaches for supporting conditional multi-store are envisioned. To illustrate, we propose an instruction set interface for a conditional multi-store mechanism consistent with certain exemplary embodiments of the present invention. We further present an example that demonstrates use of the proposed instructions. We then discuss a set of requirements for certain underlying implementations of a conditional multi-store mechanism, and present at least one illustrative implementation that meets those requirements.

New Instructions

We introduce three new types of instructions to support conditional multi-store. First, we introduce a special load-and-flag instruction, which is like any other load-type instruction, except that it identifies the loaded memory location as the flagged location upon which subsequent conditional-store operations depend. Second, we introduce a validate instruction, which can be used to determine whether the currently flagged memory location has changed since the previous load-and-flag instruction by the executing thread. Third, we introduce a special conditional-store instruction, which performs a store subject to the condition that the target of the previous load-and-flag instruction has not changed since. If contents of the targeted location have changed, the conditional-store has no effect on memory.

In some cases it will be necessary (or desirable) for a thread to be able to determine whether a conditional store succeeded (i.e., whether the result of the conditional store instruction has become visible to the memory system) or not. As will become clear later, conditional stores that provide this information may be somewhat more expensive computationally than those that do not. Therefore, it may be desirable to have (at least) two flavors of conditional-store instruction; one that provides an indication of success, and one that does not. For the purposes of illustration, the implementation we present supports a conditional-store-report-success instruction, which provides an indication of whether it succeeded or not. We assume that this indication is provided through some condition code, but based on the description herein persons skilled in the art will appreciate a variety of suitable alternatives. In the remainder of this disclosure, we use conditional-store to refer to conditional-store and/or conditional-store-report-success instructions, unless otherwise indicated.

FIG. 1 depicts two threads (101, 102) of execution operating on contents of memory 109 using load-and-flag and conditional-store instructions in accordance with some embodiments of the present invention. Both threads access addressable locations in memory 109. Thread 101 executes a load-and-flag targeting location 111 and attempts to update additional locations (e.g., locations 112, 113, 114 and 115) using conditional-store instructions to ensure that location 111 remains unchanged. At some point after completion of the conditional-store instruction that targets location 114, but before execution of the conditional-store instruction that targets location 115, another thread (thread 102) stores to location 111. Accordingly, the conditional-store instruction targeting location 115 fails. Note that multiple instances of the conditional-store operation succeed while location 111 remains unmodified.

Usage Example(s)

For clarity of exposition, we present example code that uses conditional multi-store mechanisms in a C-like pseudo-code that invokes the above instructions as functions, and treats values returned from instructions as the return values of the functions. Consider the following pseudo-code, for example:

```
bool copy_write_set(ts: *transaction_status;
                    old_ts: transaction_status;
                    ws: set of <address,value>) {
1:  tmp_ts = load-and-flag(ts);
2:  if (tmp_ts != old_ts)
3:      return false;
4:  for each pair in ws do {
5:      void *addr = pair.address;
6:      void *val = pair.value;
7:      conditional-store(addr,val);
8: }
10: new_ts.status = IDLE;
11: new_ts.version = old_ts.version + 1;
12: return conditional-store-report-success(ts, new_ts);
}
```

As previously introduced, the pseudo-code illustrates a scenario based on use of conditional multi-store constructs to copy back a transaction's write set to the memory locations changed by the transaction. The illustrated copy_write_set( ) function takes the address of a transaction status variable, a previously-observed value of the transaction status, and a write set. It uses a load-and-flag instruction to read the transaction status word and checks to see if it is the same as the transaction status passed in, returning false if not (e.g., if the transaction has already been completed by another thread). Otherwise, the function iterates over the write set, using a conditional-store instruction to store each value in the write set to its corresponding memory address. Having copied all values, the function then attempts to update the transaction status to idle, and to increment a version number in the transaction status word. It does so using the conditional-store-report-success instruction, so that it can return an indication of whether this thread was the one that completed the transaction.

Note that if two threads are currently executing a copy_write_set( ) sequence for the same transaction, and one of them reaches line 12 and successfully updates the transaction status word, then (given our description so far), the other thread will continue to execute the loop at lines 4 to 8, but its stores will not take effect, so it is essentially wasting cycles. If this were a significant problem, an improved alternative formulation of the copy_write_set( ) function can to employ the validate instruction described above to break out of the loop early. For example, by introducing the following between lines 7 and 8:

```
7a:    if (!validate( ))
7b:        return false;
```

In a variation on this approach, modification or loss of the flagged location would cause a trap, and the trap handler would react accordingly. This would obviate the validate instruction.

Semantic Guarantees for an Illustrative Embodiment

An illustrative embodiment of our invention preferably provides at least the semantic guarantees described below. However, it is important to note that other embodiments need not conform to the same requirements. Rather, semantic guarantees are described only to provide concreteness for at least one illustrative implementation. Indeed, the precise semantics provided by any given embodiment of our invention will need to be specified in the context of the memory consistency model to be provided by the architecture in which it is incorporated. Our techniques are applicable in a wide variety of such contexts. Therefore, below we describe our preferred semantic guarantees somewhat informally, but in sufficient detail that persons skilled in the art will be able to translate these or similar guarantees to the formalism required by their particular choice of memory consistency model. A memory model extended to accommodate our techniques will preferably provide a total order of load-and-flag, validate, and conditional-store accesses. We present our preferred semantic guarantees below in terms of such an order.

We use the following notation: $LAF\_P_a(b)$ denotes a load-and-flag instruction or operation by processor $P_a$ to memory location b, and $CS\_P_a(b)$ will denote a conditional-store instruction or operation by processor $P_a$ to memory location b.

Semantic Guarantee 1:

If $LAF\_P_0(x)$ is $P_0$'S most recent load-and-flag instruction when $P_0$ performs $Cs\_P_0(y)$, and if there exists a successful conditional-store instruction $Cs\_P_1(x)$ that occurred after $LAF\_P_0(x)$ and before $Cs\_P_0(y)$, then $Cs\_P_0(y)$ must fail (where $P_0$ may or may not equal $P_1$ and x may or may not equal y).

Semantic Guarantee 2.

If $LAF\_P_0(x)$ is $P_0$'s most recent load-and-flag instruction when $P_0$ performs $CS\_P_0(x)$, and if $CS\_P_0(x)$ succeeds, then all of $P_0$'s conditional-store instructions between $LAF\_P_0(x)$ and $CS\_P_0(x)$ also succeed.

Semantic Guarantee 3:

If conditional-store $CS\_P_0(x)$ fails, then no load or load-and-flag instruction sees the effect of $CS\_P_0(x)$.

Note that in the context of the software transactional memory example, Semantic Guarantee 1 ensures that a "slow" thread will not copy back a value from an "old transaction" after the transaction for which it is copying has been completed by another thread. Semantic Guarantee 2 ensures that all of the values in the write set must be copied back to their respective memory locations before the transaction status changes. Note that Semantic Guarantee 2 is quite weak with respect to ordering. For example, it does not require that the intermediate conditional-store operations (i.e., the ones before the modification of x) take effect in the same order as they are executed. Such guarantees are not required for the applications we have discussed. Whether stronger guarantees such as this should be provided by any particular implementation in accordance with our present invention is a decision to be made based on available implementation options, memory model, or other relevant factor.

For Semantic Guarantee 3, a precise definition of "seeing the effect" of a conditional-store attempt will depend on the memory model being supported. For example, in the sequential consistency or TSO memory models, the requirement could be met by stating that the store component of the conditional-store $CS\_P_0(x)$ does not appear in the global memory order. More generally, this could be defined by identifying a unique store that provides the value of each load and stating that the store component of a failed conditional-store $CS\_P_0(x)$ does not provide the value for any load or load-and-flag instruction.

In realizations of our techniques that employ store buffers for conditional-store and other store instructions (see below), Semantic Guarantee 3 may require some load or load-and-flag instructions to stall while the outcome (success or failure) of a recent conditional-store instruction is determined. This may require the processor to wait while the store buffer entry for that conditional-store instruction to drain from the store buffer. In applications in which a load from a location frequently occurs very soon after a conditional-store to that location, this may have a negative impact on performance. For at least the applications we envisage, this is not the case. For example, in the software transactional memory example, the copy_write_set function reads only from the transaction's write set and stores only to transactable memory locations, so the sets of locations loaded from and stored to are disjoint.

Nevertheless, in some realizations of our techniques, it may be preferable to avoid such stalling. This may be achieved using conventional speculation techniques (so that execution can continue speculatively while the fate of the conditional-store is determined) or by weakening Semantic Guarantee 3 to allow a processor to see the effects of a conditional-store that it executed which subsequently fails. In the latter case, it may be desirable to include a separate "barrier" instruction, which ensures that loads after the barrier do not see the effect of failed conditional-stores before the barrier. Persons skilled in the art will readily appreciate a variety of alternative implementations for such an instruction, and will also appreciate various alternatives, such as attaching barrier semantics to the load-and-flag instruction, or to conditional-store instructions that target the same location as the most recent conditional-store instruction, etc.

Progress Guarantees:

The above semantic requirements can be met by simply causing every conditional-store operation to fail. Such an implementation is clearly not useful. Ideally, we would require every conditional-store instruction to succeed until and unless the target of the previous load-and-flag instruction executed by the same thread changes.

However, providing an absolute guarantee this strong may be prohibitively expensive and complicated in many cases, and designers will take a more pragmatic view to progress guarantees. Therefore, rather than specifying a particular progress guarantee, we instead identify some potential obstacles to progress, and suggest some alternatives for avoiding them. To provide some context for this discussion, we defer it until after our presentation of our illustrative implementation.

Illustrative Implementation Environments

Figure 2:
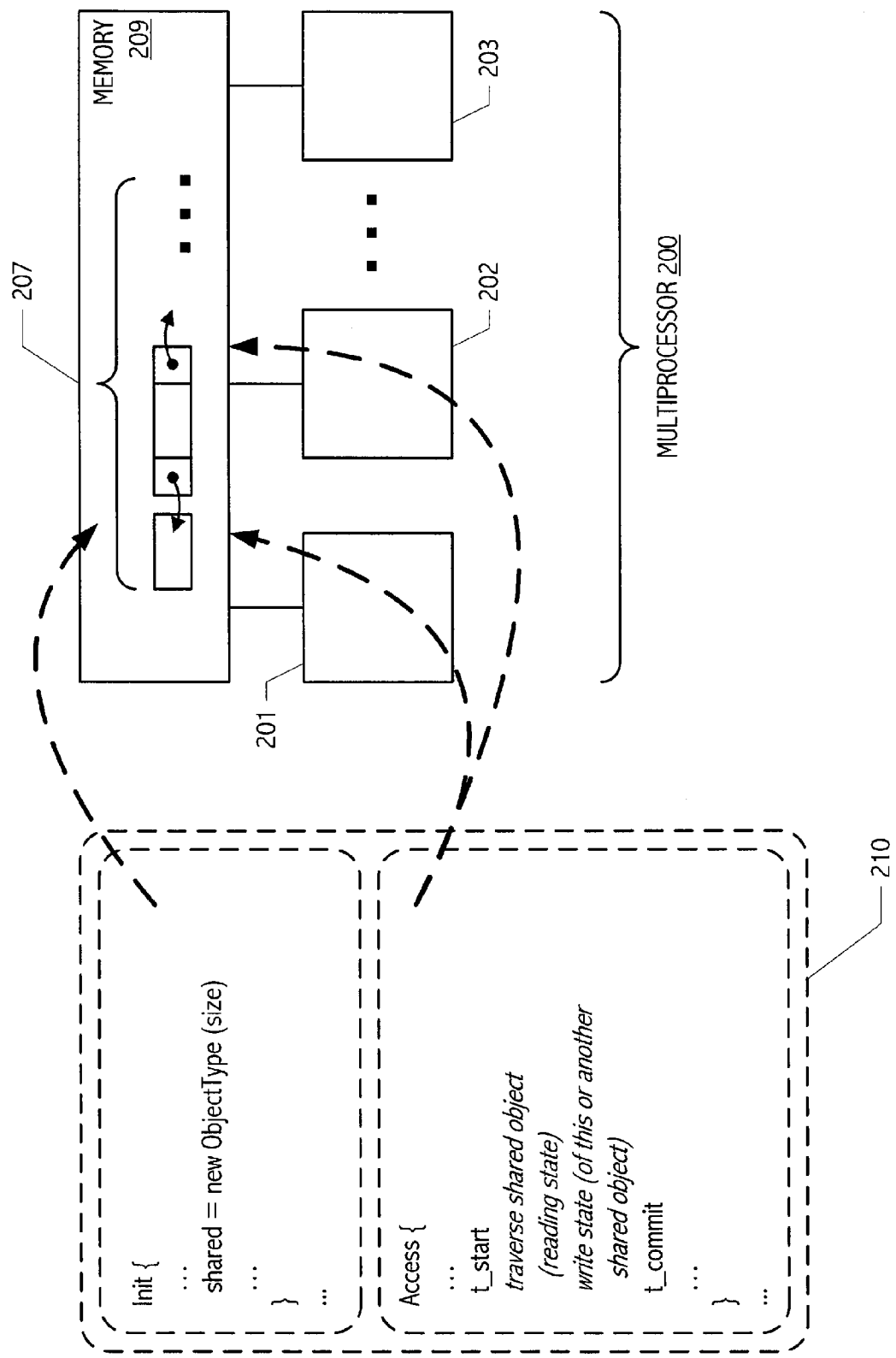
FIG. 2 depicts an exemplary multiprocessor on which techniques in accordance with present invention may be exploited

A multiprocessor is a computer in which multiple processors are configured to execute cooperative computations, typically communicating through a shared memory. A thread is an execution sequence (e.g., a program or distinct thread or strand of execution thereof) that executes for a relevant period on a single one of the processors. FIG. 2 depicts an exemplary multiprocessor 200 including multiple processors 201, 202 . . . 203, and a memory 209 of which at least a portion is shared or sharable by two or more of the processors. A given program (e.g., threads of execution corresponding to illustrated pseudocode 210) may execute on multiprocessor 200 as plural cooperating threads. Similarly, a thread of execution corresponding to a first program may cooperate with a thread of execution corresponding to a second program. Threads typically manipulate data structures (e.g., data structure 207) that reside in memory (e.g., in one or more physical stores corresponding to memory 209).

For simplicity of illustration, hierarchies of storage (e.g., levels of cache and memory) typical of modern processor architecture are not separately illustrated. Rather, persons of ordinary skill in the art will appreciate a variety of memory architectures corresponding to memory 209, including those in which processors (e.g., processors 201, 202 . . . 203) maintain or manage at least one level of data cache. Often, individual processors each maintain or manage a local data cache and coordinate their individual caching states using an appropriate coherence maintaining technique. In general, any of a variety of conventional cache coherence techniques may be employed. In this way, at least some data states represented in memory 209 may be cached local to a processor that is likely to employ them, while coherence mechanisms allow local copies to be invalidated or updated if another processor's access would otherwise result in an incoherent view of memory 209. In some caching architectures, a data cache may be shared (at some level in a memory hierarchy) by multiple processors.

In general, any of a variety of caching architectures may be adapted to support our conditional multi-store techniques. Indeed the implementation approach we now describe builds upon certain facilities or operations of existing cache coherence protocols to identify changes to a memory location that for reasons that will become clear we wish to treat as flagged. Persons familiar with processor implementations that support load-linked/store-conditional (LL/SC) instruction pairs and existing designs for hardware transactional memory and related mechanisms will recognize some similarities and will appreciate, based on our description, how such implementations may be adapted to support our conditional multi-store techniques.

For reasons of concreteness, we illustrate our techniques in the context of conventional caching terminology and constructs. For example, we refer to units of storage managed by the caching mechanism as a cache line and tend to explain our operations on units of storage that are cache line denominated. Of course, while cache lines typically aggregate multiple individually addressable units of storage (e.g., 16, 32, 64 bytes or more) as a memory management unit, the definition of a cache line is, in general, implementation specific. As a general matter, the techniques we describe may be applied to units of storage (or blocks) that range from the smallest addressable storage units to aggregations of addressable storage units that may (or may not) correspond to one or more cache lines in a particular implementation.

So that we can avoid duplication of processor structures and support (and to focus our description), we illustrate our conditional multi-store techniques assuming that at least some implementations thereof operate upon cache line denominated units of storage and track relevant conditional multi-store states at cache line granularity. Nonetheless, based on such description, persons of ordinary skill in the art will appreciate a range of suitable implementations and/or adaptation including those in which memory operations and/or conditional multi-store state tracking is performed at some other granularity, e.g., based on blocks that are smaller than, different from, or larger than a cache line. Therefore, in view of the above, and without limitation, we illustrate an implementation of our conditional multi-store techniques in the context of conventional caching terminology and constructs and assuming cache line granularity for managed storage blocks.

In accordance with some embodiments of the present invention, a processor that executes a load-and-flag instruction acquires access (usually read access) to a cache line containing the target location, and records information sufficient to facilitate monitoring of the cache line to detect when it is modified or lost. Such monitoring allows the implementation to determine that the flagged cache line has not changed or been lost since the load-and-flag instruction before allowing the effects of a conditional-store to become visible to the memory system. Monitoring also facilitates correct responses to subsequent validate instructions.

In more detail, a load-and-flag instruction can be implemented as follows. The instruction first reads the targeted location as usual, acquiring read access rights to the cache line containing the location if such rights are not already held. We call this cache line the "flagged" cache line. The load-and-flag instruction further records information to facilitate monitoring of the flagged cache line to detect when it is lost or modified. Various alternatives exist. Two example approaches are:

1. Dedicate a special location in the processor for information related to the cache line read by the most recent load-and-flag instruction. This approach typically involves modifications to the circuits that look up the cache, as the dedicated location must also be checked. Based on our descriptions here, such modifications are straightforward for one skilled in the art.
2. Dedicate a bit on each cache line in the cache that indicates whether the cache line contains the target of the most recent load-and-flag instruction.

As mentioned above, the location loaded by the most recent load-and-flag instruction is monitored for changes in order to prevent subsequent conditional stores from taking effect after the location changes, and to give correct responses to executions of the validate instruction. As in load-linked/store-conditional and transactional memory implementations, this monitoring can be achieved by augmenting the actions taken in response to a request for a cache line and perhaps also in response to stores executed by the local processor. If the flagged cache line is lost from the cache for any reason, then the processor loses the ability to perform subsequent stores while ensuring that the loaded value does not change. Therefore, the processor needs to record sufficient state to prevent such stores from occurring and to provide a correct (false) response to a subsequent validate instruction (see below). The loss of the cache line might be due to an explicit request for the location by another processor, or it might be due to an eviction resulting from the processor loading a different cache line. As discussed later, implementations that avoid the latter reason are preferable.

In general, an appropriate definition of "sufficient state" to record when the flagged cache line is lost depends on the implementation of the validate instruction and of store instructions. We describe one approach below. However, based on that description, a variety of alternatives will be appreciated by persons skilled in the art.

Figure 3:
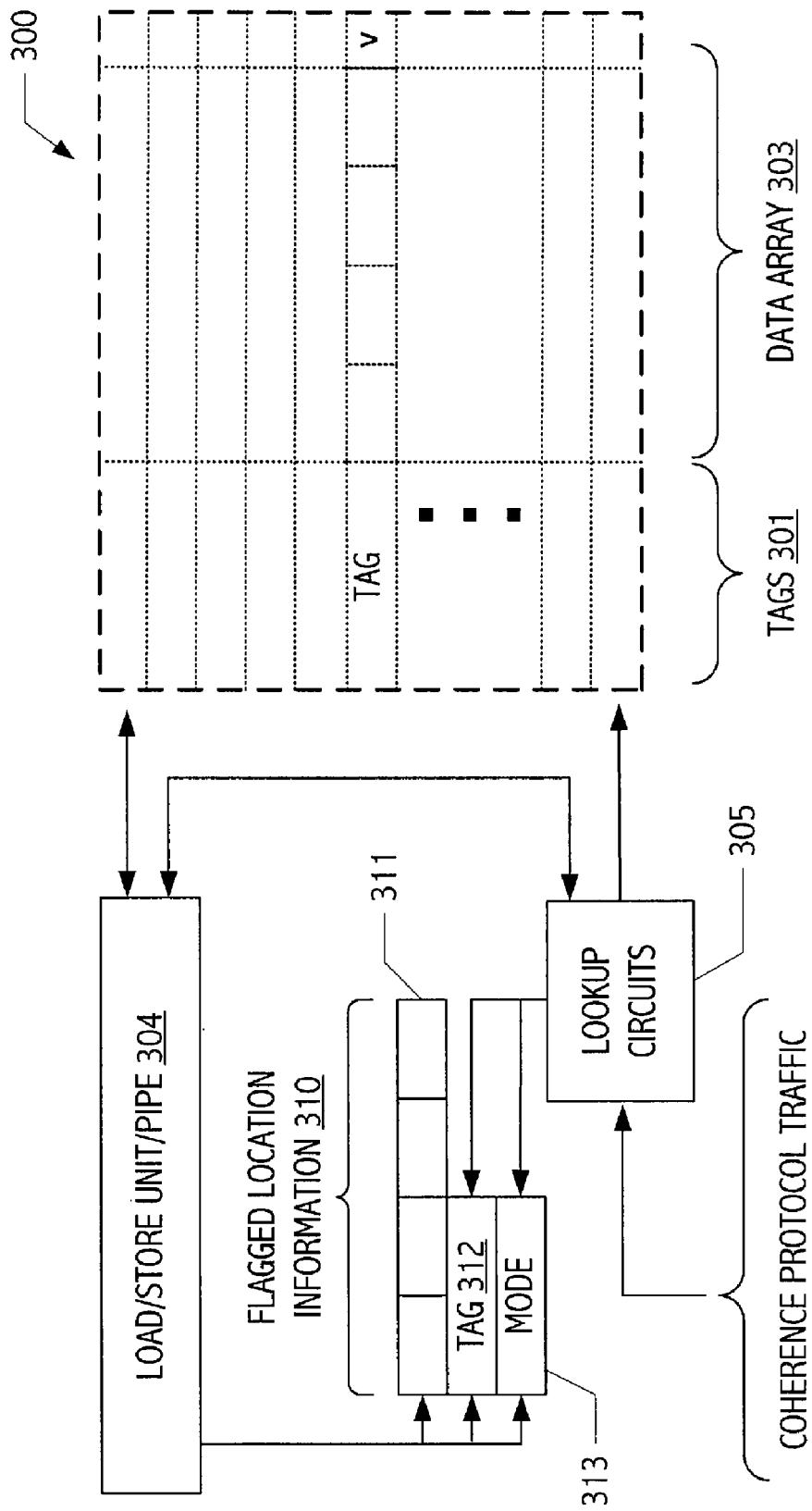
FIG. 3 depicts a configuration in accordance with some embodiments of the present invention in which processor functional units and/or cache circuits are augmented to track information in support of a conditional multi-store mechanism.

FIG. 3 depicts a configuration in accordance with some embodiments of the present invention in which a dedicated location 310 is used to record information related to a cache line that contains a storage location flagged based on execution of a load-and-flag instruction. The dedicated location is accessible both to load/store functionality of the processor (e.g., to load/store unit or pipe 304) and to cache lookup circuits 305. Lookup circuits 305 may be employed in a variety of conventional cache operations; however, for purposes of the present discussion, at least some lookups are performed against both the tags (301) of cache array 300 and information (e.g., tag/address 312) of flagged location information 310. For example, such dual lookups are performed in response to coherence protocol traffic such as invalidate directives from other processors or memory subsystems or based on snooped updates. In this way, conventional cache operations and protocols may be leveraged to facilitate our implementation of a conditional multi-store mechanism.

In the illustrated configuration, data is stored (311) together with a tag or other address-type identifier (312) for the cache line containing the flagged location. Storage 313 for a MODE indication is also provided in the illustrated implementation and will be understood based on the description that follows, although persons of ordinary skill in the art will recognize that in at least some realizations, explicit MODE storage need not be provided as the relevant states may be implicitly coded in other ways (e.g., based on presence of a non-null flagged location and/or tag). Cache arrays (tags 301 and data array 303) are of largely conventional design.

Load/store unit or pipe 304 is illustrated as a functional block and incorporates any of a variety of typical design variations and/or optimizations including, for example, the use of store buffers as described in greater detail below. Of course, separate load and store units may be provided in some embodiments. In any case, load and store units update contents of flagged location information 310 in correspondence with execution of load-and-flag and store-conditional instructions as more completely described below. Finally, although a single instance of flagged location information 310 is illustrated, persons of ordinary skill in the art will appreciate that multiple instances may be provided if desired. Design variations for tracking multiple in-flight load-and-flag operations are discussed later.

In our example implementation, the load-and-flag instruction stores the loaded cache line in a dedicated location in the processor, and this location also contains (at least logically) an additional state component (call it MODE) indicating which of the following scenarios is true:

NORMAL: either no load-and-flag instruction has ever been executed, or a load-and-flag instruction has been executed, and the processor has maintained read access to the flagged cache ever since the previous load-and-flag instruction LOST_OR_MODIFIED: a load-and-flag instruction has been executed, and the flagged cache line has been lost or modified since the most recent load-and-flag instruction Given this arrangement, a load-and-flag instruction sets MODE to NORMAL, and any action that results in loss of read access to the flagged cache line, or modification to the flagged cache line, sets MODE to LOST_OR_MODIFIED.

In response to a validate instruction, the processor provides a response (through a condition code for example) of false if MODE=LOST_OR_MODIFIED, and true otherwise. We next describe how a processor can be modified to prevent conditional-store instructions from taking effect that are executed after the cache line flagged by the most recent load-and-flag instructions is modified or lost.

First, consider a simple processor in which a store instruction acquires exclusive ownership of the cache line containing the location to be written, and then stores the required value into the cache line before beginning execution of the next instruction. In such processors, conditional-store instructions simply check if MODE=LOST_OR_MODIFIED while holding exclusive ownership of the target cache line. If not, the value is transferred to the cache line as usual, and if so the value is simply discarded.

A common architectural optimization is to include a "store buffer" into which address-value pairs are inserted in response to store instructions. The use of such store buffers allows the processor to continue executing instructions while waiting to acquire exclusive ownership of the cache line corresponding to the target address of the store. Our invention is compatible with such optimizations. As usual, stores can be inserted into the store buffer and execution can continue, pending acquisition of ownership of the cache line to allow the store to be completed. However, before the processor causes a conditional-store to become visible to the memory system, it first checks whether the cache line containing the memory location that was tagged when the conditional-store instruction was executed has since been lost or modified. Note that the processor needs to be able to distinguish address-value pairs inserted into the store buffer for normal store operations and pairs inserted for conditional-store instructions. This can be achieved by adding a bit to each store buffer entry to indicate whether the store was normal or conditional.

In general, it is not sufficient to simply check MODE to decide whether to allow the contents of a store buffer entry to become visible to the memory system because it is possible that the location that was flagged when the conditional-store was executed has since been modified, but another load-and-flag instruction has been executed since, setting mode back to NORMAL. There are several alternatives for addressing this problem.

One simple approach is to remove all store buffer entries that are marked as conditional from the store buffer each time a load-and-flag instruction is executed. However, this might violate Semantic Requirement 2 above if the flagged location were modified and became visible to the memory system while other values stored by conditional-store instructions were still in the store buffer. Processing the store buffer only in FIFO order would solve this problem, as it would ensure that all previous stores have taken effect before the store to the flagged location takes effect. This is compatible with most existing store buffer designs, which process their entries only in FIFO order anyway. Another approach is to have the processor retain and track multiple flagged cache lines, including at least those that were flagged when a conditional-store instruction was executed that still has an entry in the store buffer. In this case, we would need to record which flagged location corresponds to each store buffer entry, perhaps by storing an index into a dedicated table of flagged cache lines, or by storing with each store buffer entry the address of the cache line that was flagged when the corresponding conditional-store instruction was executed.

Yet another approach would be to wait while the store buffer drains upon executing a load-and-flag instruction. An optimization to this approach would be to revert to simply removing all conditional-store entries from the store buffer if MODE is or becomes LOST_OR_MODIFIED.

Recall that the conditional-store-report-success instruction provides an indication of whether or not the store takes effect. In designs that use store buffers as described above, the processor cannot simply add an entry to the store buffer and continue executing—as is the case with conditional-store instructions—because it must provide this indication of success. Several alternatives are possible. A simple approach is to stall until the new entry is drained from the store buffer, thus allowing the processor to provide an indication of whether or not the store took effect before executing the next instruction. In this case, the conditional-store-report-success instruction may be significantly more expensive than the conditional-store instruction, and this motivates our introducing separate instructions for these purposes. Another alternative is to use well known speculation techniques, so that the processor can assume that the store is successful and then speculate ahead while waiting for a determination of whether the store in fact takes effect; if it does not, then the state is rolled back to the store, and the correct indication is given that the store did not take effect.

Figure 4:
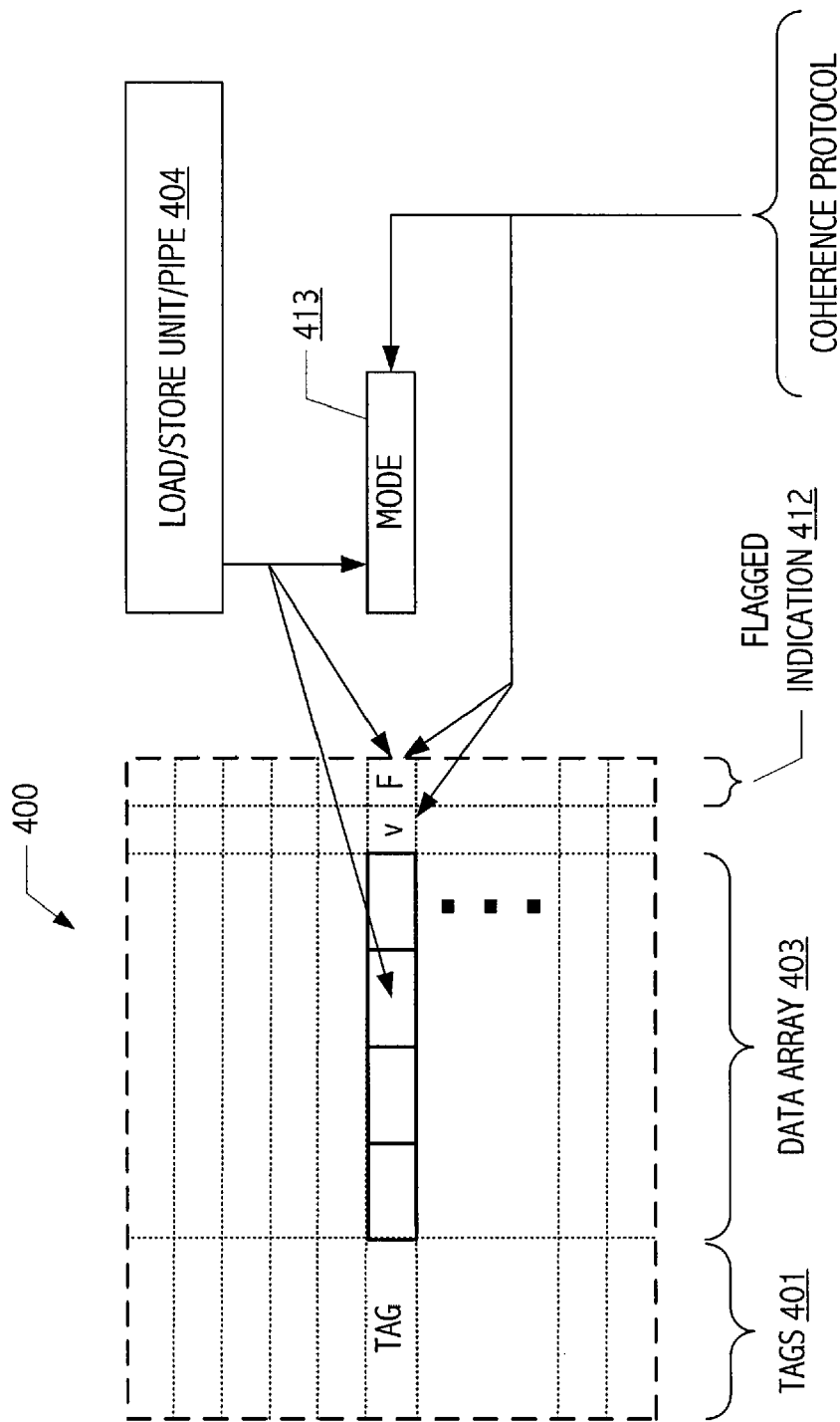
FIG. 4 depicts another configuration in accordance with some embodiments of the present invention in which processor functional units and/or cache circuits are augmented to track information in support of a conditional multi-store mechanism.

FIG. 4 depicts a variation on the previously described embodiments in which storage is defined at least partially within a cache implementation (400) to record information related to a cache line (or cache lines) that contain storage location(s) flagged based on execution of a load-and-flag instruction. Operation is analogous to that described above with reference to FIG. 3 except that the indication that a given cache line is "flagged" is maintained in storage (e.g., flagged indication 412) more closely integrated with tag 401 and data array 403 of cache 400.

Lookup circuits (not specifically shown) are employed as in conventional cache operations, e.g., in response to coherence protocol traffic such as invalidate directives from other processors or memory subsystems or based on snooped updates. For simplicity of illustration, only the impact of local processor load/store traffic and coherence protocol traffic is illustrated. In the illustrated configuration, cache data is stored in data array 403 together with an associated tag for the cache line containing the flagged location. Storage 413 for a MODE indication is also provided in the illustrated implementation and will be understood based on the preceding description, cache 400 (particularly, tags 401 and data array 403) are of largely conventional design except for the addition of a flagged location indication 412.

As before, load/store unit or pipe 404 is illustrated as a functional block and incorporates any of a variety of design variations and/or optimizations including, the use of store buffers. As before, separate load and store units may be provided in some embodiments. In any case, load/store units update contents of flagged location information 412 and mode 413 in correspondence with execution of load-and-flag and store-conditional instructions as described herein. Design variations for tracking multiple in-flight load-and-flag operations are discussed below.

Progress Guarantees & Pragmatism

Various progress guarantees can be made by different realizations of our techniques, and various tradeoffs arise when considering such guarantees. Ideally, we would like to guarantee that every conditional-store instruction executed by a processor after it executes a load-and-flag instruction eventually takes effect (i.e., becomes visible to the memory system) unless the flagged location changes. In the context of our copy_write_set( ) example, this would guarantee that if a set of threads all execute copy_write_set( ) for the same transaction, then one of them successfully completes the copying and changes the transaction's status to IDLE.

A strong guarantee such as the "ideal" one mentioned above requires the processor to continue to monitor a location that has been flagged by a thread, even when the thread is preempted and is not running. Thus, the processor must maintain state for every thread running on it concurrently, rather than just the thread (or in the case of chip multithreading, threads) that is (or are) currently running. Matters are further complicated by the possibility that an interrupt handler might use the conditional multi-store feature, and providing a strong guarantee like the one described above may then require the implementation to monitor multiple tagged locations per thread.

Providing a dedicated location for one cache line each for the maximum possible number of threads on a processor (including the preempted ones) is unlikely to be cost effective. One alternative is to provide dedicated resources for some smaller number of cache lines, and to have a mechanism for reserving resources for a load-and-flag instruction. This way, programmers would need to deal with the possibility of being unable to reserve such resources, but at least in this case would know that once resources are reserved, the cache line will not be lost simply because of the need for resources by another thread. Another alternative suitable for embodiments (such as illustrated in FIG. 4) is to augment the encoding of flagged location identification 412 to identify (directly or indirectly) a particular thread for which the corresponding entry is "the cache read by a most recent load-and-flag instruction."

Nonetheless, we expect that most designs consistent with our techniques will tolerate the possibility that the cache line containing the location flagged by a particular thread will occasionally be modified or lost, even though the flagged location is not modified. In the parlance of the load-linked/store-conditional instruction pair mechanisms, this corresponds to a "spurious failure," in which a store-conditional fails even though the target location did not change since the previous load-linked. The issues for conditional multi-store are similar and, based on the description herein, will be appreciated by persons skilled in the art. In general, spurious failures may require programmers to check whether progress has really been made, or whether a spurious failure occurred. In the latter case, the conditional multi-store sequence will generally be retried.

It is therefore important that such designs provide the minimal guarantee that spurious failures do not occur deterministically when a single thread retries repeatedly without interference from other threads or from interrupts. If this were possible, the conditional multi-store mechanism would not be particularly useful as a sole mechanism for copying back a write set, for example.

In general, tolerable spurious failures may be caused by a variety of events. For example, if a processor provides resources for only one flagged location at a time, then when a thread that has flagged a location is preempted, and another thread executes a load-and-flag instruction, the cache line being monitored by the first thread must be evicted to accommodate the new one. A similar situation arises if a thread experiences an interrupt, and the interrupt handler uses the conditional multi-store mechanism. In both cases, a particular design may choose to evict the cache line proactively upon preemption or occurrence of an interrupt in order to simplify association of a flagged location with the thread that flagged it.

Another possible cause of a spurious failure is that the flagged cache line may be lost or modified because some other location that happens to fall into the same cache line is modified. This is similar to the well known "false sharing" problem, in which performance degrades when two processors concurrently access separate variables in the same cache line. Well known "padding" software techniques can be used to avoid this problem.

None of the above reasons occur deterministically, and therefore may be deemed acceptable for particular designs consistent with this invention. However, other reasons for spurious failures should be avoided completely. For example, consider a design in which no resources are dedicated to monitoring the flagged cache line, and instead a cache line in the regular (say L2) cache is used for this purpose (of course with some indication that this cache line is being monitored). In this case, interaction with other code executed within a conditional multi-store sequence might deterministically cause the flagged cache line to be evicted. For example, if the cache in question is direct mapped, then an instruction executed (assuming no separate I-cache) or a variable accessed during the conditional multi-store sequence might happen to map to the same cache line as the flagged location does. In this case, retrying the sequence will not help, as it will always fail. Even if the cache is set associative, this does not automatically guarantee that such deterministic failures cannot occur, so some care is required.

Alternative Designs and Variations

Persons skilled in the art will appreciate that numerous variants of load-and-flag type instructions might be provided, corresponding to the variety of load instructions in existing architectures, for example to load different sized data values, to treat the value loaded as signed or unsigned, etc.

An alternative approach for avoiding stores from taking effect after a modification to a memory location targeted by a previous load-and-flag is for changes to the location loaded by the most recent load-and-flag instruction to cause a trap. In this case, we would avoid the unnecessary continued execution of a conditional multi-store sequence whose flagged location has already changed. This approach would also obviate the need for a validate instruction.

Some realizations of our techniques could provide information about the reason for a conditional-store failing. For example, the distinction between the flagged cache line being lost due to preemption or an interrupt, and being lost due to an actual request for the cache line might allow code to avoid testing for progress in the case that the cache line has been lost. This assumes that the flagged location is appropriately padded to avoid false positives due to false sharing.

An alternative approach, which may involve changes to some cache coherence protocols, is for coherence requests to specify which location they intend to modify, so that the processor can distinguish between requests made in order to change the flagged location, and requests made in order to change other locations in the same cache line.

Contrast with Existing Mechanisms

Load-linked/store-conditional (LL/SC) instruction pairs are supported by at least MIPS, Alpha, and PowerPC chips. These instructions are similar to at least some our conditional multi-store mechanism. However, in all of these chips, only a single store can be made conditional upon a previous load, whereas conditional multi-store does not limit the number of stores executed while a single location is monitored. Also, most of these implementations require that the store-conditional instruction targets the same memory location as the preceding load-linked, whereas our conditional multi-store mechanism imposes no such restriction, which makes it considerably more versatile in applications such as the hybrid transactional memory implementation that we discuss herein.

There are a variety of designs for transactional memory and similar mechanisms in the literature. These designs have some similarity to conditional multi-store in that they monitor locations read previously, and prevent subsequent stores from taking effect in case a monitored location changes. However, transactional memory and related mechanisms must buffer all stores, ensuring that none of them takes effect, until the entire sequence (transaction) is completed. This naturally imposes limits on the number of stores that can be executed by any transaction. Furthermore, transactional memory may have to monitor multiple locations that are read by the transaction. This again imposes limitations. For example, in a design based on monitoring cache lines in a 4-way set associative cache, a particular transaction might happen to access 5 variables that all map to the same cache set. Such a transaction would be doomed to fail deterministically. Our techniques facilitate implementations in which programmers do not have to think and reason about such things.

Because the semantics of conditional multi-store is weaker than that of transactional memory and related mechanisms, implementations do not have to impose such limits. For example, because the stores in a conditional multi-store sequence do not have to take effect atomically, there is no need to buffer them all before allowing any to take effect, and so the size of a store buffer does not impose a limitation on how many stores can be performed. This is an advantage of conditional multi-store, as it allows (for example) hybrid transactional memory implementations to commit transactions of arbitrary size. In practice (and absent our techniques), it might take an extended period of time to perform the copy_write_set( ) function for a very large transaction. As a result, the probability of encountering preemption or an interrupt while executing the function is high.

Because applications of conditional multi-store do not require all of the stores to be performed atomically, it is straightforward to address this problem by using a finer grained approach to copying. For example, the transaction status word in a software transactional memory implementation might be augmented with a "progress counter" which indicates how much of the write set has already been copied. This way, the copying can be broken up into phases such that each phase is short enough to ensure that repeated interrupts and preemptions do not cause it to fail repeatedly. The size of these phases could even be dynamically adapted to current conditions, performing a lot of copying in one conditional multi-store sequence while this is effective, and then reducing the amount of copying attempted in each sequence if interrupts or preemptions are preventing progress too frequently.

Other Embodiments

While the invention(s) is (are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

While we have described our invention mostly in the context of a multiprocessor system made up of processor chips, it will be appreciated by persons skilled in the art that our invention is equally applicable to chip multithreading (CMT) systems. In such case, state that we have described as being per processor would be replicated per strand in each CMT chip. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of operating a processor, the method comprising:

in response to a load-and-flag instruction that specifies a load source as an operand, acquiring ownership of a set of addressable storage locations, wherein the acquired set comprises the load source;

subsequent to said acquiring, in response to a first instance of a conditional-store instruction that specifies a first store target as an operand, storing a first result to the first store target if the acquired set remains owned and contents thereof remain unmodified since said acquiring; and in response to a subsequent instance of the conditional-store instruction that specifies a second store target as an operand, storing a second result to the second store target if the acquired set remains owned and contents thereof remain unmodified since said acquiring;

wherein the first store target and the second store target are different addressable storage locations.

2. The method of claim 1, wherein at least one of the first and second store targets is not a same addressable storage location as the load source.

3. The method of claim 1, wherein said storing a first result and said storing a second result are not performed together within a single atomic operation.

4. The method of claim 1, further comprising:

in response to a third instance of the conditional-store instruction that follows the first and subsequent instances of the conditional-store instruction, but which is executed after the acquired set is lost or after contents thereof are modified, the third instance of the conditional-store instruction failing to store to a third store target thereof.

5. The method of claim 1, wherein the addressable storage is organized as a memory hierarchy that includes a cache, and wherein the acquired set corresponds to a cache line that contains the load source.

6. The method of claim 1, wherein the load source and the second store target correspond to a same addressable storage location or a same cache line.

7. The method of claim 1, wherein the load source and the first and second store targets each correspond to a different addressable storage location or a different cache line.

8. A computer program product encoded in one or more machine readable media, the computer program product comprising:

an instruction sequence executable on a processor, the instruction sequence including a load-and-flag instruction followed in program order by at least two successive instances of a conditional-store instruction;

wherein each of the instances of the conditional-store instruction is executable to successfully complete a store to a respective target location thereof, in both case in which the respective target locations are the same addressable storage location and a case in which the respective target locations are at different addressable storage locations, if, at its respective time of execution, a load source of the preceding load-and flag instruction remains owned by the processor and contents thereof remain unmodified since execution of the load-and-flag instruction.

9. The computer program product of claim 8, wherein the load-and-flag instruction specifies the load source as an operand, wherein execution of the load-and-flag instruction, if successful, acquires ownership of a set of addressable storage locations, and wherein the acquired set comprises the load source.

10. The computer program product of claim 9, the instruction sequence further comprising:

a third instance of the conditional-store instruction that follows the at least two successive instances of the conditional-store instruction in program order, but which, if executed after the previously acquired set is lost or after contents thereof have been modified since execution of the load-and-flag instruction, fails to store to a store target thereof.

11. The computer program product of claim 8, wherein a store target of at least one of the two successive instances of the conditional-store instruction is not a same addressable storage location as the load source.

12. The computer program product of claim 8, wherein the load source and a store target of one of the two successive instances of the conditional-store instruction correspond to a same addressable storage location or a same cache line.

13. The computer program product of claim 8, wherein each of the load source and respective store targets of the at least two successive instances of the conditional-store instruction corresponds to a different addressable storage location or a different cache line.

14. The computer program product of claim 8, wherein, during execution of the instruction sequence, first and second ones of the at least two successive instances of the conditional-store instruction do not take effect as a single atomic operation.

15. The computer program product of claim 8, wherein the one or more machine readable media are selected from the set of disk, tape or other magnetic, optical or electronic storage media.

16. A processor that implements an instruction set comprising:

a load-and-flag instruction that specifies a load source as an operand, wherein upon execution of the load-and-flag instruction, the processor attempts to acquire ownership of a set of addressable storage locations, and wherein the acquired set comprises the load source; and a conditional-store instruction that specifies a store target as an operand, wherein upon execution of each of a plurality of successive instances of the conditional-store instruction, the processor stores a respective result to a respective store target, in both a case in which the respective store targets are a same addressable storage location and a case in which the respective store targets are a different addressable storage locations, only if, at the respective time of execution, an acquired set remains owned and contents thereof remain unmodified since its acquisition by a previously executed load-and-flag instruction.

17. The processor of claim 16, wherein execution of a particular instance of the conditional-store instruction fails to store a result to a store target thereof if ownership of the acquired set has been lost or if contents of the acquired set have been modified since acquisition of the acquired set by the previously executed load-and-flag instruction.

18. The processor of claim 16, wherein the implemented instruction set includes a variant of the conditional-store instruction that reports either or both of success in storing a result to a store target thereof and failure to store a result to a store target thereof for a particular execution thereof.

19. The processor of claim 16, wherein valid instances of the conditional-store instructions include those for which the specified store target is not the same as the load source of a preceding load-and-flag instruction.

20. the computer program product of claim 8, wherein, during execution of the instruction sequence, first and second ones of the at least two successive instances of the conditional-store instruction take effect as a single atomic operation.

* * * * *